United States Patent
Park et al.

(10) Patent No.: US 6,913,384 B2
(45) Date of Patent: Jul. 5, 2005

(54) DEVICE FOR RECORDING CURING TEMPERATURE HISTORY ON PRECAST CONCRETE PRODUCTS

(75) Inventors: Kwang-Soo Park, Anyang (KR); Su-Gyun Shin, Suwon (KR); Kwan-Ho Kim, Ansan (KR); Meyong-Won Kim, Gwacheon (KR); Joon-Gu Lee, Inchun (KR)

(73) Assignee: Korea Agricultural & Rural Infrastructure Corporation, Kyunggi-do (KR)

( * ) Notice: Subject to any disclaimer, the term of this patent is extended or adjusted under 35 U.S.C. 154(b) by 0 days.

(21) Appl. No.: 10/638,286

(22) Filed: Aug. 7, 2003

(65) Prior Publication Data

US 2004/0252745 A1 Dec. 16, 2004

(30) Foreign Application Priority Data

Jun. 10, 2003 (KR) ................................ 10-2003-0037279

(51) Int. Cl.$^7$ ............................ G01K 3/04; G01K 1/14; G01K 7/36
(52) U.S. Cl. ....................... 374/102; 374/103; 374/208; 374/141; 73/866.5
(58) Field of Search ................................ 374/100–102, 374/45, 55–56, 208, 141, 139, 170, 163, 103; 73/803, 866.5, 573, 577

(56) References Cited

U.S. PATENT DOCUMENTS

| | | | | |
|---|---|---|---|---|
| 3,295,358 A | * | 1/1967 | Boenisch | 374/55 |
| 4,138,892 A | * | 2/1979 | Davis | 73/866.4 |
| 4,566,806 A | * | 1/1986 | DeBondt | 374/53 |
| 4,629,330 A | * | 12/1986 | Nichols | 368/89 |
| 4,673,057 A | * | 6/1987 | Glassco | 181/144 |
| 4,748,855 A | * | 6/1988 | Barnoff | 73/803 |
| 4,943,930 A | * | 7/1990 | Radjy | 702/33 |
| 5,083,464 A | * | 1/1992 | Martinello | 73/803 |
| 5,248,200 A | * | 9/1993 | Walsh | 374/45 |
| 5,541,855 A | * | 7/1996 | Enzler et al. | 702/113 |
| 6,591,691 B2 | * | 7/2003 | Kim et al. | 73/803 |
| 2002/0157484 A1 | * | 10/2002 | Bishara | 73/865.6 |
| 2003/0235306 A1 | * | 12/2003 | Fox et al. | 380/255 |

FOREIGN PATENT DOCUMENTS

JP       02118432 A  *  5/1990  ............ G01N/3/18

* cited by examiner

*Primary Examiner*—Gail Verbitsky
(74) *Attorney, Agent, or Firm*—Sheridan Ross PC (57) ABSTRACT

Disclosed is a device for recording a curing temperature history on precast concrete products, which is buried in a precast concrete product so as to record curing temperature and time histories during a steam curing procedure and to inform a user/inspector of recorded data, thereby controlling the quality of the steam curing concrete products. The device comprises: a socket formed in the shape of a hexahedron, including a collection chamber opened at the upper portion thereof, a hole formed through a lower portion of one side wall, and a magnet installed on another side wall and serving to operate a capsule when the capsule is inserted into the collection chamber, and to protect components of the capsule when the device is buried in a designated position of the precast concrete product to be cured; and a capsule formed in the shape of a hexahedron, accommodated in the collection chamber of the socket, and provided with a MCU (Micro Controller Unit) installed on a printed circuit board within the capsule and switched on/off by the magnet of the socket, senses a curing temperature of the precast concrete product by means of the control signal of the MCU when the device is buried in the designated position of the precast concrete product detects light with a photo sensing unit when the precast concrete product is cured, informs a user of data regarding the sensed temperature and light, and stores the data.

10 Claims, 9 Drawing Sheets

DEVICE FOR RECORDING CURING TEMPERATURE HISTORY ON PRECAST CONCRETE PRODUCTS

BACKGROUND OF THE INVENTION

1. Field of the Invention

The present invention relates to a device for recording a curing temperature history on precast concrete products, and more particularly to a device for recording a curing temperature history on precast concrete products, which is buried in a precast concrete product so as to record curing temperature and time histories during a steam curing procedure and to inform a user/inspector of recorded data, thereby controlling the quality of the steam curing concrete products.

2. Description of the Related Art

Generally, concrete curing refers to a procedure in which proper temperature and humidity (moisture) are imposed on concrete so as to achieve sufficient hardenability between a step of mixing concrete and another step of hardening concrete, or a procedure in which an exposed surface of concrete is protected from excessive impact or load, wind, rain, frost, light before the concrete is hardened so as to have a sufficient strength.

Concrete curing is generally divided into three methods, i.e., common curing, steam curing, and autoclave curing. Individual procedures of the above three curing methods will be described in detail as follows.

In the common curing procedure, concrete is pressed in a mold, and water is sprayed or a water-soaked straw bag or sawdust is covered over the concrete for 1 week so that the surface of the concrete is not dried, without the rise of temperature, thereby preventing lack of the strength of the concrete and cracks formed in the concrete due to drying shrinkage, and freezing of the concrete.

In the steam curing procedure, over several hours after the mixing of concrete, temperature and moisture are provided to the concrete via steam so as to have a proper strength at an initial stage. Generally, concrete products for use in road construction or precast concrete products are cured by this steam curing procedure. A concrete bench flume is a typical one of these concrete products manufactured by the steam curing procedure.

In the autoclave curing procedure, the compressive strength of the concrete is remarkably improved by fibrous crystals, which is a cement hydrate generated under a high-temperature and a high-pressure condition.

Figure 1:
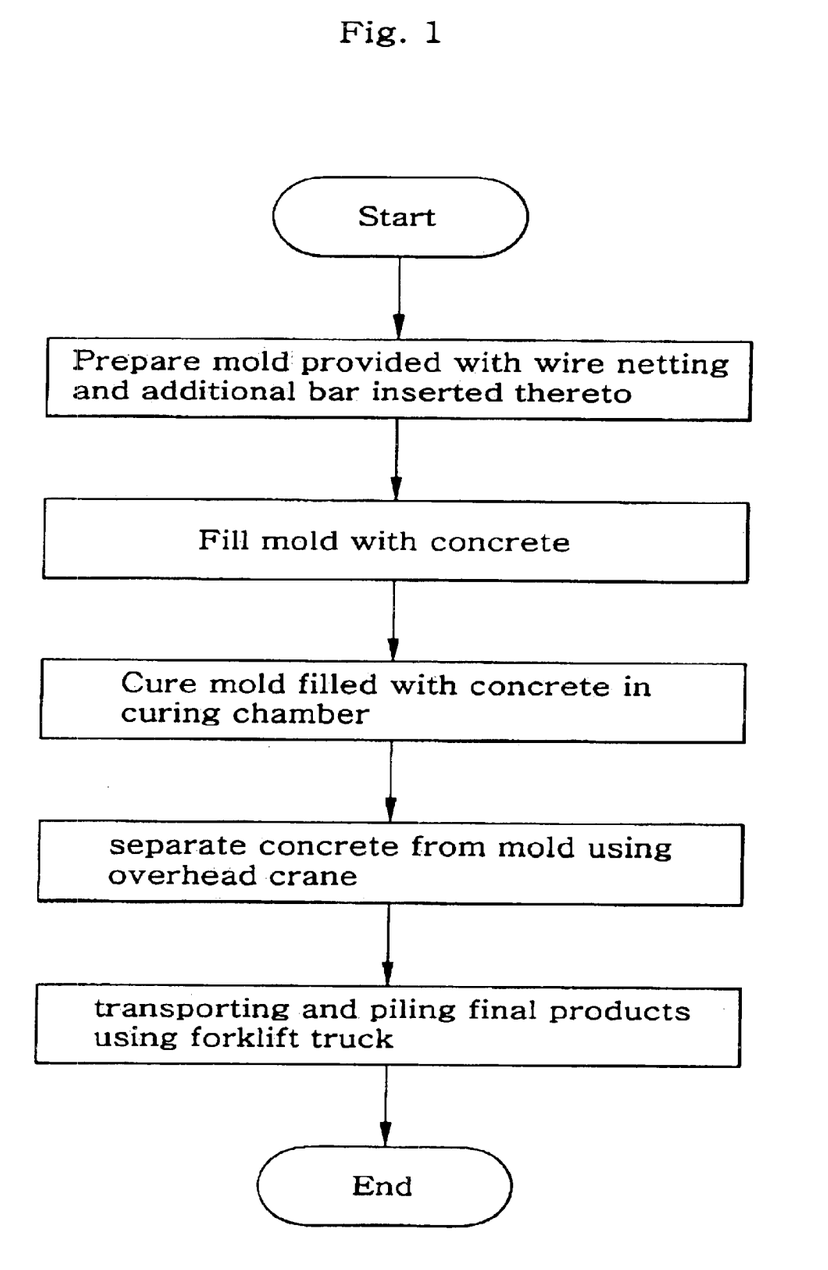
FIG. 1 is a flow chart illustrating a general process for manufacturing steam-cured precast concrete products.

As shown in FIG. 1, at a factory, a concrete product is manufactured by acceleratedly curing concrete by means of steam of a high-temperature. First, non-hardened watery concrete fills a mold and is pressed using vibration or centrifugal force. Subsequently, the mold filled with the pressed concrete is transferred to a steam-curing chamber of a high temperature and then cured therein. The mold filled with the cured concrete is taken out of the curing chamber, and the cured concrete is separated from the mold. A plurality of the cured concretes are stacked and stored outdoors.

Figure 2:
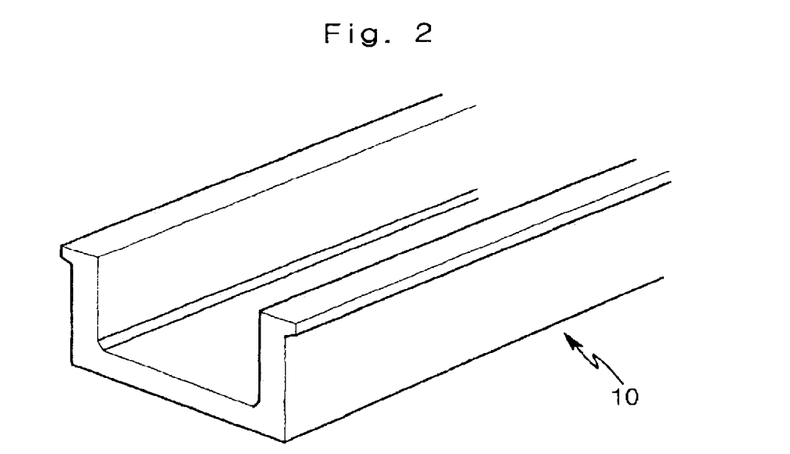
FIG. 2 is a perspective view of a bench flume among the precast concrete products manufactured by the process of FIG. 1.
Figure 3:
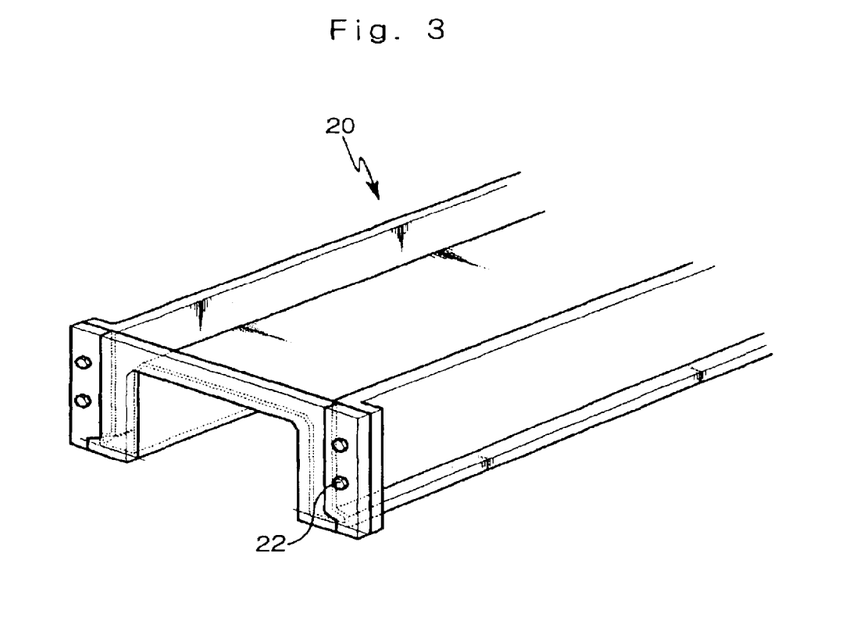
FIG. 3 is a perspective view of a mold used in manufacturing the bench flume of FIG. 2.

For example, in case that a bench flume 10 shown in FIG. 2 is manufactured, a mold 20 shown in FIG. 3 is prepared. The non-hardened watery concrete fills the mold 20 and is pressed using vibration and centrifugal force. Then, the mold 20 filled with the pressed concrete is transferred to the steam-curing chamber of a high temperature and cured therein in a short period of time.

The mold 20 filled with the cured concrete is taken out from the steam-curing chamber, and the cured concrete is separated from the mold 20. Thereby, the concrete bench flume shown in FIG. 2 is obtained. The obtained bench flume are transferred outdoors and then piled.

When the bench flume is separated from the mold 20, connection means such as screws 22 for connecting a flange to a main body of the mold 20 are detached from the flange and the main body.

Figure 10:
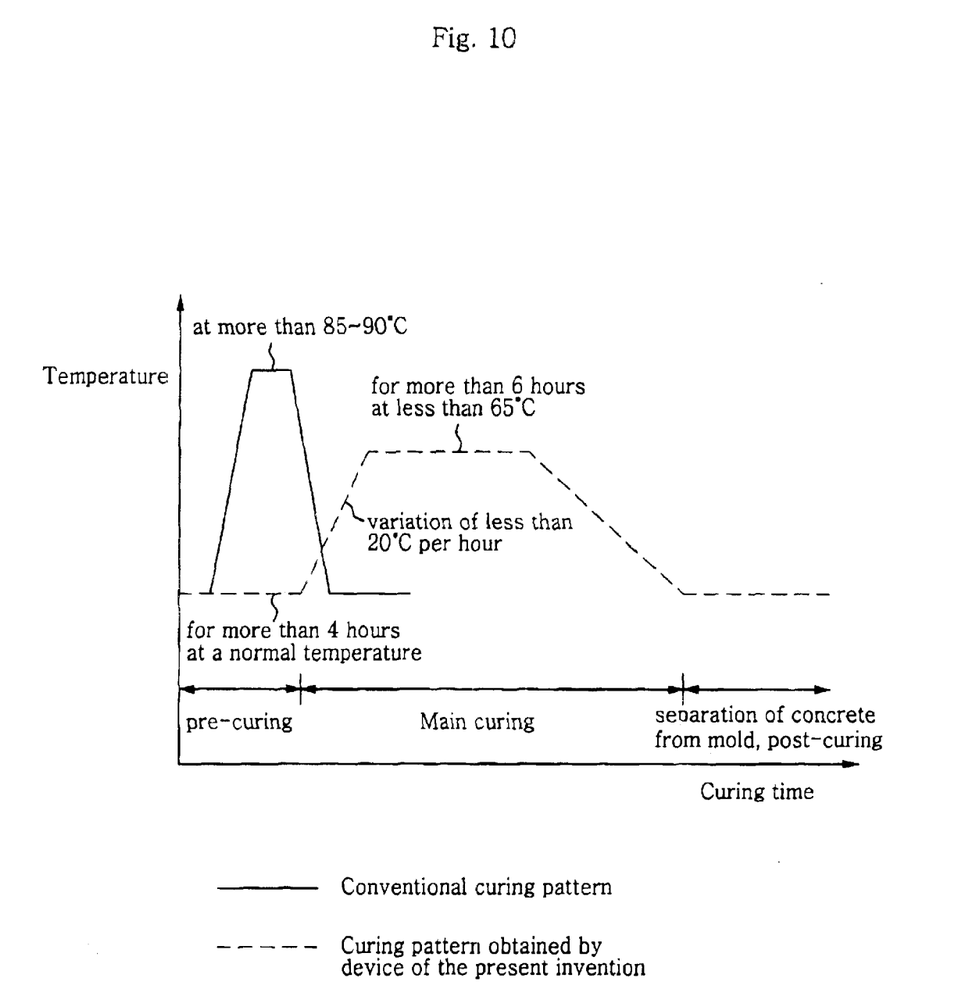
FIG. 10 is a graph comparatively illustrating an ideal curing temperature history obtained by the recording device of the present invention and a conventional curing temperature history.

When the concrete is acceleratedly cured, as indicated by a dotted line in FIG. 10 (a curing pattern of concrete in accordance with the present invention), the concrete is maintained at a normal temperature for approximately 4 hours so that an initial hydration reaction is performed. Then, after the initial hydration reaction is completed, the concrete is transferred into the steam-curing chamber.

Here, steam is supplied into the steam-curing chamber, such that the temperature in the steam-curing chamber rises less than 20° C. per hour, thereby maximally being 65° C.

This maximum high temperature is maintained for approximately 6 hours, and then the supply of steam is controlled so that the temperature in the steam-curing chamber falls less than 20° C. per hour. Thereby, it is possible to improve the quality of an acceleratedly cured concrete product (i.e., a bench flume), thus lengthening the life time of the product.

In this case, it takes more than approximately 16 hours to perform one cycle of the steam curing procedure for manufacturing products, thus improving the production cost of the concrete product and reducing the productivity of the concrete product manufacturing process. Accordingly, it is difficult to actually use the above conventional steam curing procedure to mass-produce concrete products.

In order to solve the above problems, an actual manufacturer heats concrete at a temperature of more than 85° C.~90° C. using a temporary expedient, thereby completing one cycle of a curing procedure within 5~6 hours.

However, with this method, a time taken to expose concrete to steam of a high temperature is shorter than a time taken to set cement. Accordingly, non-hydrated cement is produced, thus reducing the quality of the resulting concrete product.

Further, since the maximum temperature is more than 85° C.~90° C., the pore structure of the hydrate is weak and easily damaged by the freezing-thawing. Thus, fine cracks are excessively formed in the hydrate by thermal expansion and contractile force due to sudden change of the temperature.

In case that the fine cracks are formed in concrete, the obtained concrete product installed on a moist soil is easily damaged by the freezing-thawing. Thereby, the life cycle of the concrete product is remarkably shortened up to 7~8 years.

The shortage of the life cycle of the concrete product causes the cost for installing another replacement concrete product. Further, since waste products must be disposed and raw material for producing additional product (aggregate and cement) is required, the shortage of the life cycle of the concrete product seriously destroys soil environment.

SUMMARY OF THE INVENTION

Therefore, the present invention has been made in view of the above problems, and it is an object of the present invention to provide a device for recording a curing temperature history on precast concrete products, which is buried in a precast concrete product so that the device can record curing temperature and time histories during a whole procedure of steam curing and a inspector can check the recorded data, thereby improving the quality of the steam-curing products, such as durability.

In accordance with the present invention, the above and other objects can be accomplished by the provision of a device for recording a curing temperature history on precast concrete products, comprising:

a socket formed in the shape of a hexahedron, including a collection chamber opened at the upper portion thereof, a hole formed through a lower portion of one side wall, and a magnet installed on another side wall and serving to operate a capsule when the capsule is inserted into the collection chamber, and to protect components of the capsule when the device is buried in a designated position of the precast concrete product to be cured; and a capsule formed in the shape of a hexahedron, accommodated in the collection chamber of the socket, and provided with a MCU (Micro Controller Unit) installed on a printed circuit board within the capsule and switched on/off by the magnet of the socket, senses a curing temperature of the precast concrete product by means of the control signal of the MCU when the device is buried in the designated position of the precast concrete product or light entering into the precast concrete product when the precast concrete product is cured, informs a user of data regarding the sensed temperature and light, and stores the data.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 4:
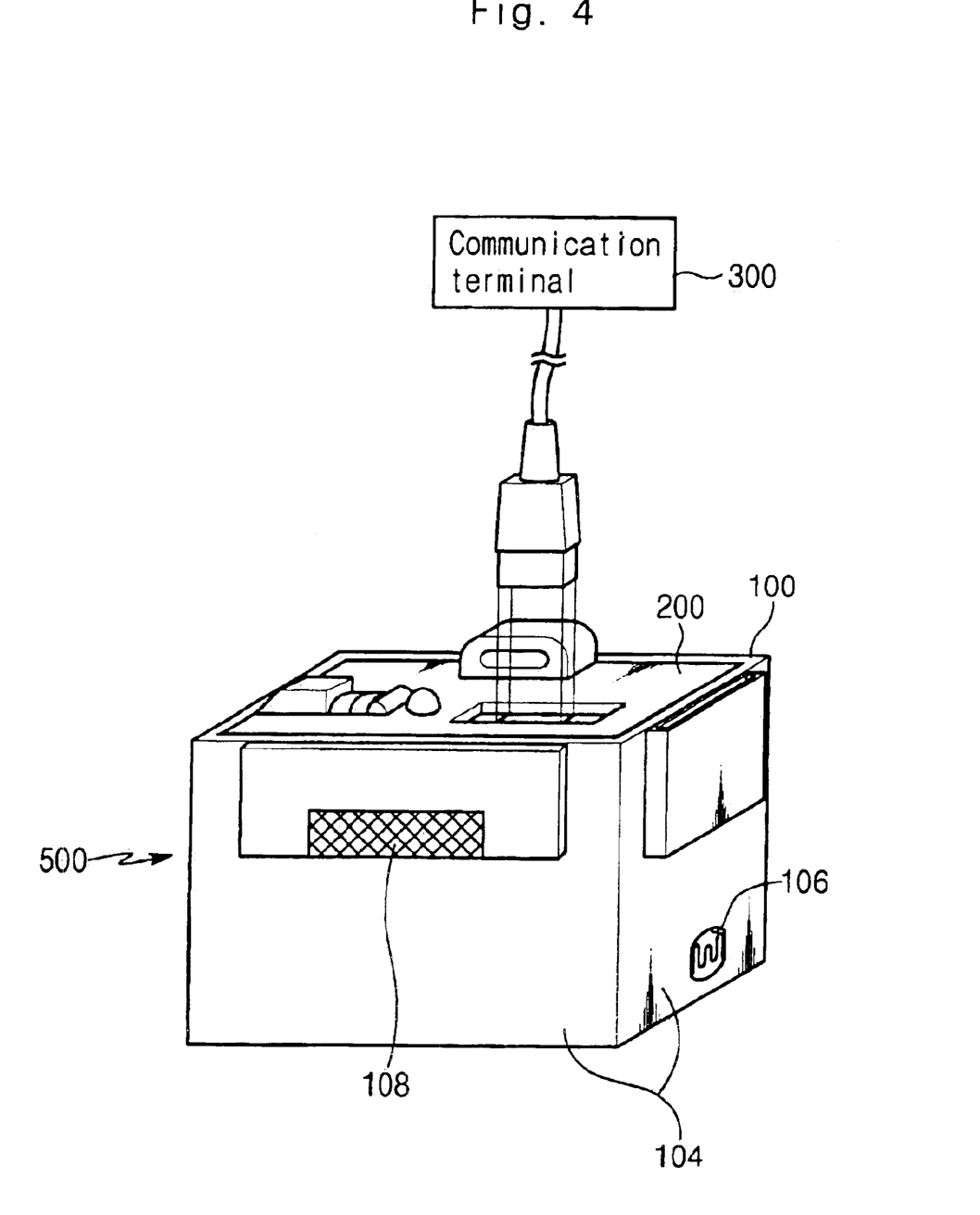
FIG. 4 is a schematic view of a device for recording a curing temperature history on precast concrete products in accordance with the present invention, which is connected to a communication terminal.

FIG. 4 is a schematic view of a device for recording a curing temperature history on precast concrete in accordance with the present invention, which is connected to a communication terminal.

As shown in FIG. 4, the device 500 for recording a curing temperature history on precast concrete of the present invention comprises a socket 100 formed in the shape of a hexahedron, and a capsule 200 formed in the shape of a hexahedron. The socket 100 includes a collection chamber (not shown) opened at the upper portion thereof, a hole 106 formed through a lower portion of one side wall 104, and a magnet 108 installed on another side wall 104. The socket 100 serves to operate the capsule when the capsule 200 is inserted into the collection chamber, and to protect components of the capsule 200 when the device 500 is buried in a designated position of concrete to be steam-cured. The capsule 200 is accommodated in the collection chamber of the socket 100, and includes a MCU (Micro Controller Unit) installed on a substrate (not shown) located within the capsule 200. The MCU is switched on/off by the magnet 108 of the socket 100. The capsule 200 serves to sense a curing temperature of the concrete when the device 500 is buried in a designated position of the concrete product or the entrance of light when the concrete is cured, and to inform a user of the sensed data and store various data.

The device 500 is connected to the communication terminal 300 so that the stored various data can be displayed to a user via the communication terminal 300.

Hereinafter, with reference to FIG. 5, the above-described device 500 for recording a curing temperature history of precast concrete products will be described in detail.

Figure 5:
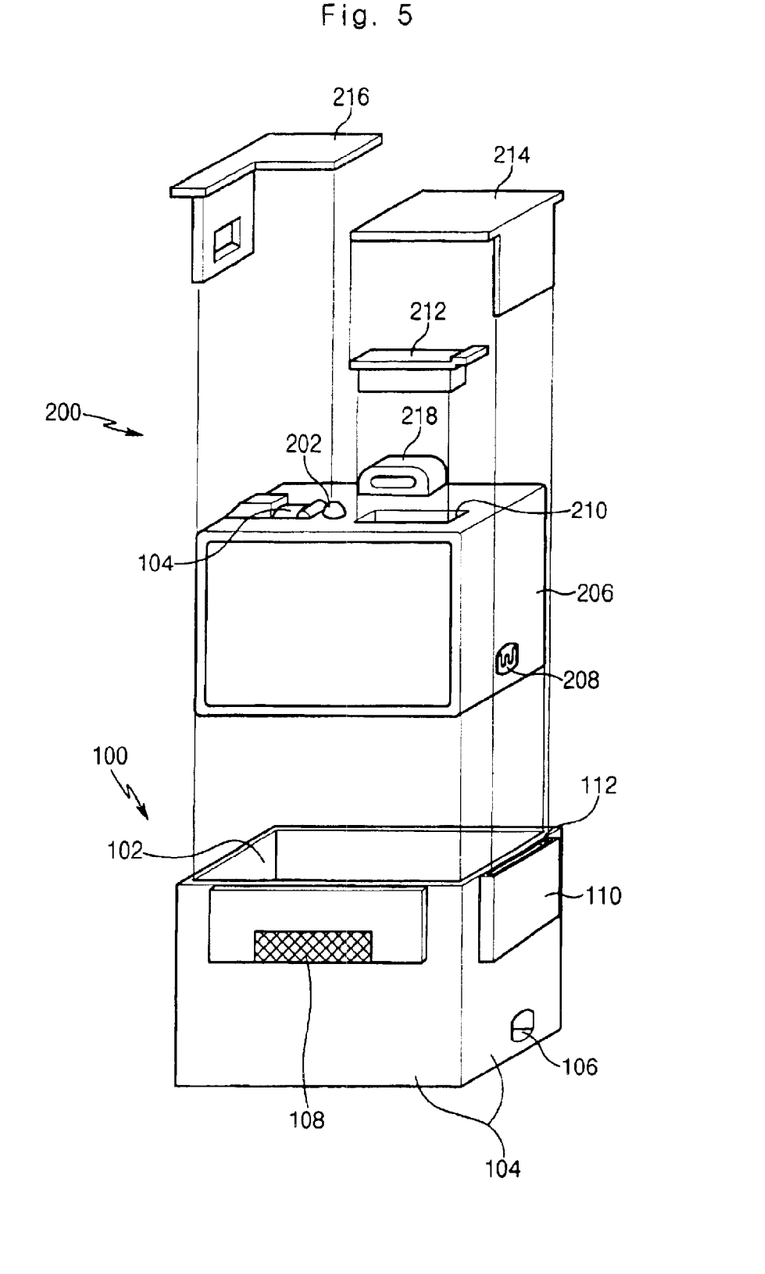
FIG. 5 is an exploded view of a device for recording a curing temperature history on precast concrete products in accordance with the present invention.
Figure 6A:
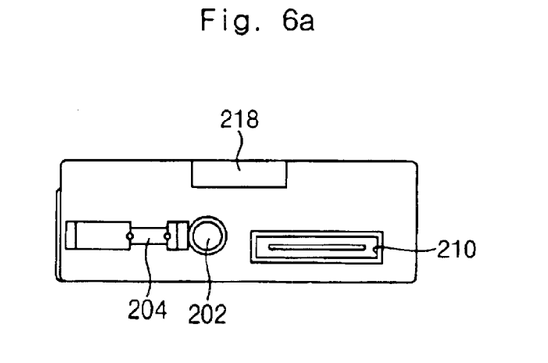
FIG. 6a is a cross-sectional view of a capsule of the device of FIG. 5.
Figure 6B:
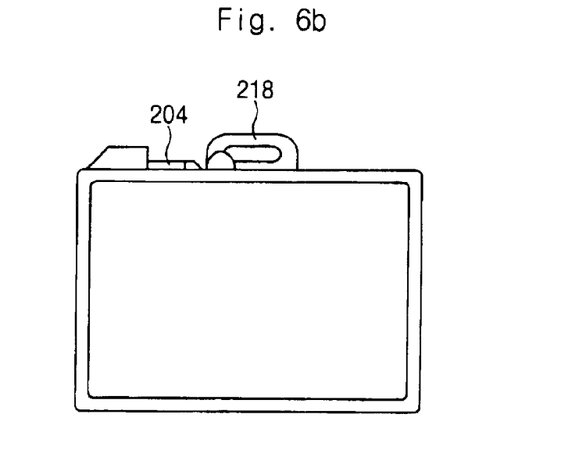
FIG. 6b is a longitudinal-sectional view of the capsule of the device of FIG. 5.
Figure 6C:
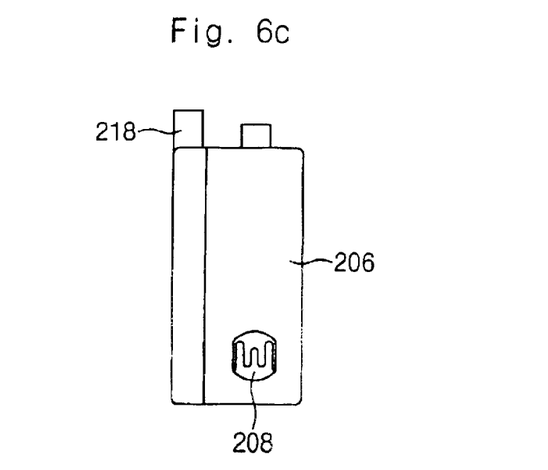
FIG. 6c is another longitudinal-sectional view of the capsule of the device of FIG. 5.
Figure 7A:
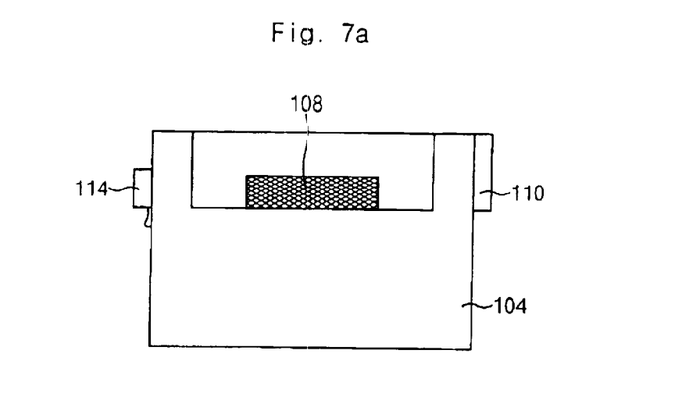
FIG. 7a is a cross-sectional view of a socket of the device of FIG. 5.
Figure 7B:
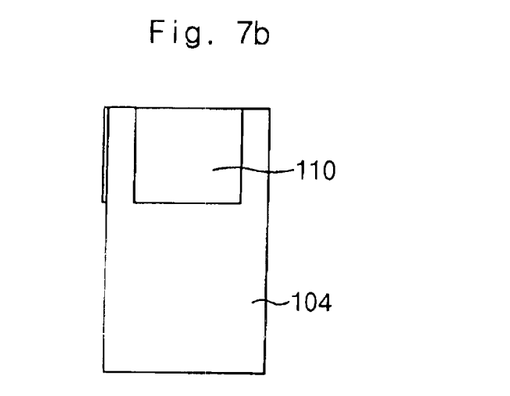
FIG. 7b is a right longitudinal-sectional view of the socket of the device of FIG. 5.
Figure 7C:
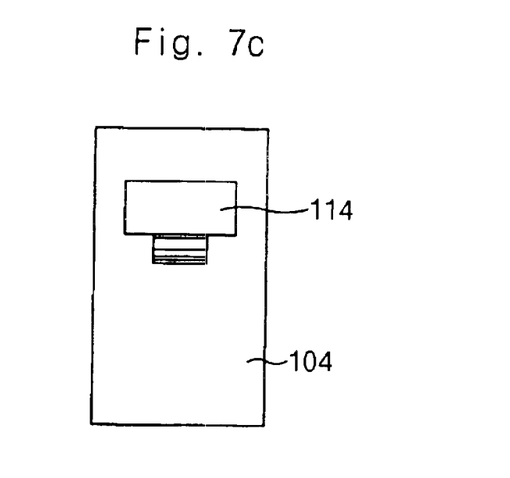
FIG. 7c is a left longitudinal-sectional view of the socket of the device of FIG. 5.

FIG. 5 is an exploded view of a device for recording a curing temperature history on precast concrete in accordance with the present invention. FIG. 6a is a cross-sectional view of a capsule of the device of FIG. 5. FIG. 6b is a longitudinal-sectional view of a capsule of the device of FIG. 5. FIG. 6c is another longitudinal-sectional view of a capsule of the device of FIG. 5. FIG. 7a is a cross-sectional view of a socket of the device of FIG. 5. FIG. 7b is a right longitudinal-sectional view of a socket of the device of FIG. 5. FIG. 7c is a left longitudinal-sectional view of a socket of the device of FIG. 5.

As shown in FIG. 5 and FIGS. 6a to 6c, the capsule 200 includes a state displaying unit 202, a temperature sensing unit 204, a photo sensing unit 208, a communication port 210, a protective rubber cap 212, a first cover 214, a second cover 216, and a hand grip 218. The state-displaying unit 202 is installed on the upper surface of the capsule 200 and switched on by the magnet 108 of the socket 100 when the capsule 200 is accommodated in the collection chamber 102 of the socket 100, and serves to display various lights (red light, green light, and flashing red light) depending on the control of the MCU (not shown). The temperature-sensing unit 204 is installed at one side of the state displaying unit 202, and serves to sense the curing temperature of concrete per every designated time period (for example, 10 minutes) and then to store the sensed temperature in the MCU. The photo-sensing unit 208 is installed at a lower portion of one sidewall 206 of the capsule 200, and serves to sense whether light is entering into the concrete within 6 hours after the beginning of the measurement of the curing temperature. The communication port 210 is installed at the other side of the state-displaying unit and connected to the communication terminal, and serves to transmit the various data stored in the MCU to the communication terminal. The protective rubber cap 212 protects the communication port 210 from the concrete when the device 500 is buried in the concrete. The first cover 214 is detachably inserted into a collection chamber 112 of a first fixing unit 110 to be described later, and serves to protect the protective rubber cap 212. The second cover 216 is detachably inserted into a collection chamber (not shown) of a second fixing unit (not shown) to be described later and installed on the rear surfaces of the state displaying unit 202 and the temperature sensing unit 204, and serves to protect the capsule 200. The handgrip 218 serves to easily carry the capsule 200 and to detach from the socket 100.

As shown in FIG. 5 and FIGS. 7a to 7c, the socket 100 includes a collection chamber 102 for accommodating the capsule 200, the magnet 108, the first fixing unit 110, and the second fixing unit 114. When the capsule 200 is accommodated in the collection chamber 102, the magnet 108 serves to switch on a capsule operating switch (not shown) on the substrate (not shown) located in the capsule 200, thereby operating the capsule 200. The first fixing unit 110 is installed on the outer surface of one sidewall 104 of the socket 100, and the collection chamber of the first fixing unit 110 serves to accommodate and fix the first cover 214 of the capsule 200. The second fixing unit 114 is installed on the outer surface of another side wall 104 of the socket 100, and the collection chamber (not shown) of the second fixing unit 114 serves to accommodate and fix the second cover 216.

Figure 8:
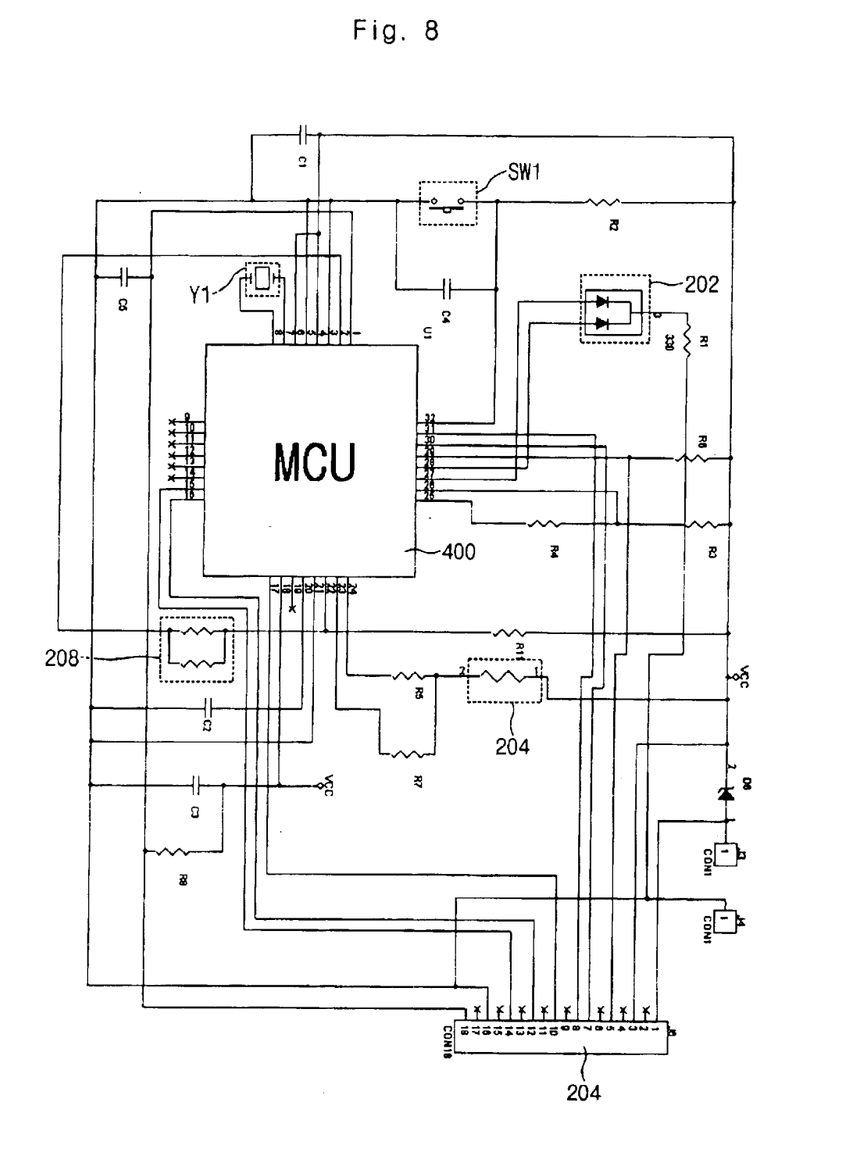
FIG. 8 is a circuit diagram of a printed circuit board installed in the capsule of the device of FIG. 5.

Hereinafter, with a circuit diagram, the operation of the capsule 200 controlled by the MCU on the printed circuit board installed in the capsule 200 will be described in detail.

FIG. 8 is a circuit diagram of the printed circuit board installed in the capsule of the device of FIG. 5.

As shown in FIG. 8, the printed circuit board installed in the capsule 200 includes a capsule operating switch (SW1), a MCU 400, the state displaying unit 202, the temperature sensing unit 204, an oscillator (Y1), the photo sensing unit 208, and the communication port 210. The capsule-operating switch (SW1) is switched on by the magnet 108 when the capsule 200 is accommodated in the collection chamber 102 of the socket 100, and serves to supply operating power to the MCU 400. The MCU serves to receive the operating power from a battery (not shown) by means of the switching-on/off the capsule operating switch (SW1) and control components installed on the printed circuit board by receiving, and to store various data from the components. The state displaying unit 202 receives a control signal from the MCU 400 and displays various lights (red light, green light, and flashing red light) to a user. The temperature-sensing unit 204 senses the curing temperature of concrete per every designated time period (for example, 10 minutes) in the concrete curing by means of the control signal of the MCU 400 and then transmits the sensed temperature to the MCU 400. The oscillator (Y1) is asynchronously operated, and maintains the time by interrupting a sleep mode of the MCU 400 per every 4 seconds and saving the operating power. The photo-sensing unit 208 receives the control signal of the MCU 400, and then senses whether light is entering into the concrete within an initially designated time (for example, 6 hours) after the beginning of the measurement of the curing temperature. The communication port 210 is connected to a port of a communication terminal, and serves to transmit the various data stored in the MCU 400 to the communication terminal, thereby allowing the communication terminal to display the various data to a user.

Here, the state-displaying unit 202 emits a red light, when the capsule 200 is accommodated in the collection chamber 102 of the socket 100 in accordance with the control of the MCU 400.

Further, the state-displaying unit 202 emits a green light, when the temperature-sensing unit 204 measures the curing temperature of concrete in accordance with the control of the MCU 400.

Moreover, the state-displaying unit 202 interruptedly emits a red light (a red light on and off), when the battery is discharged in accordance with the control of the MCU 400.

In case that the photo sensing unit 208 senses light within the initially designated time (for example, 6 hours) after the beginning of the measurement of the curing temperature, the MCU 400 deletes all data stored prior to the sensed time.

In case that the photo sensing unit 208 continuously senses light during the initially designated time (for example, 6 hours) after the beginning of the measurement of the curing temperature, the MCU 400 recognizes the user to have no intention of performing the concrete curing and then initializes the program.

Hereinafter, a process for assembling the above-described device for recording a curing temperature history on precast concrete products will be described in detail.

First, the battery for operating the capsule 200 is electrically charged via the communication port 210 of the assembled capsule 200.

In order to protect the communication port 210 of the capsule 200, a protective rubber cap 212 is attached to the communication port 210.

Subsequently, in order to accommodate the collection chamber 102 of the socket 100 with the capsule 200 and prevent the capsule 200 from separating from the collection chamber 102 of the socket 100, the first cover 214 is fixedly inserted into the collection chamber 112 of the first fixing unit 110, and the second cover 216 is fixedly inserted into the collection chamber (not shown) of the second fixing unit 114.

At this time, the capsule 200 is switched on by the magnet 108 of the socket 100.

Accordingly, the state displaying unit 202 of the capsule 200 emits a red or green light in accordance with the control of the MCU 400, thus informing the user of normal operation of the capsule 200.

Hereinafter, the operation of the above-assembled device for recording a curing temperature history on precast concrete products will be described in detail.

Figure 9:
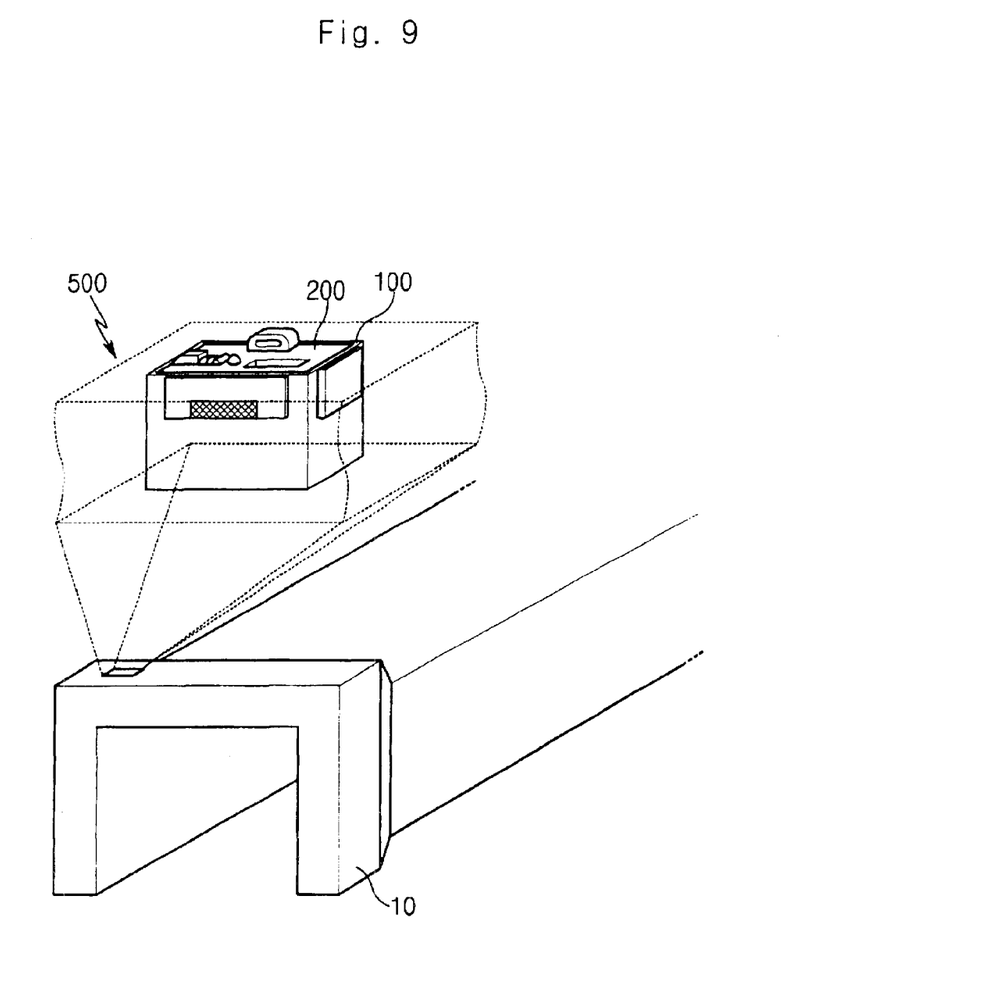
FIG. 9 is a schematic view of a device for recording a curing temperature history on precast concrete products in accordance with the present invention, which is installed in a designated position of one precast concrete product.

First, as shown in FIG. 9, the capsule 200 storing various data such as a company name, a factory name, an identification code, a curing date, a curing time, a usage count, an inspection date, etc. is accommodated by the collection chamber 102 of the socket 100. Then, the socket 100 with the capsule 200 is buried in a designated position of a precast concrete product.

The temperature-sensing unit 204 senses a curing temperature of the precast concrete product by means of the control signal of the MCU 400 (for example, the temperature sensing unit 204 is designed such that it senses the curing temperature of the precast concrete product per every 10 minutes during 20 hours).

Here, the curing temperature sensed by the temperature-sensing unit 204 is transmitted to the MCU 400.

Then, the MCU 400 stores the curing temperature transmitted from the temperature-sensing unit 204.

Particularly, when the capsule 200 is accommodated by the socket 100 so that the temperature-sensing unit 204 measures the curing temperature of the precast concrete product, the state displaying unit 202 emits a green light in accordance with the control of the MCU 400.

In case that the state displaying unit 202 is continuously maintained in a red light even when the temperature sensing unit 204 measures the curing temperature of the precast concrete product, the device 500 is regarded as being in an abnormal condition.

Accordingly, as shown in FIG. 10, the MCU 400 stores the curing temperature of the precast concrete product, measured per the initially designated time (every 10 minutes during 20 hours).

After a designated time (approximately 10 minutes) passes, the oscillator (Y1) is operated so that the MCU is entered into the sleep mode, thereby saving the operating power.

The photo-sensing unit 208 senses whether light is entering into the concrete within the designated time (for example, 6 hours) after the beginning of the measurement of the curing temperature in accordance with the control signal of the MCU 400.

Here, in case that the photo sensing unit 208 senses light, the MCU deletes all data stored therein prior to the time when the photo sensing unit 208 senses light.

Further, in case that the photo sensing unit 208 continuously senses light during 6 hours, the MCU 400 recognizes the user to have no intention of performing the concrete curing and then initializes the program.

Moreover, in case that the photo sensing unit 208 does not sense any light, as shown in FIG. 10, the MCU 400 regards this curing process as being in a normal condition.

On the other hand, the MCU 400 senses the capacity of the battery. When the battery is discharged, the state displaying unit 202 interruptedly emits a red light.

In case that a user wants to view various data stored in the MCU 400 of the device 500 for recording a curing temperature history on precast concrete products, the communication port 210 of the capsule 200 is connected to a port of a communication terminal.

Thereby, the communication terminal displays various data stored in the MCU 400. In case that the obtained curing temperature and time are recorded and then output to the user, the stored data regarding the curing temperature and time are represented as a dotted line in FIG. 10.

By selecting all or a part of concrete products piled in a field and then reading data stored in the MCU 400 buried in each of the selected concrete products using the communication terminal 300, a purchaser, which wants to buy some concrete products, can check whether curing conditions of the selected concrete products satisfy his/her requirements.

Thereby, it is possible to check whether the curing conditions of the selected concrete products satisfy purchasers' requirements without individually inspecting the products one by one.

As apparent from the above description, the present invention provides a device for recording a curing temperature history on precast concrete products, which is buried in a designated position of one end of a precast concrete product so as to record curing temperature and time histories during a steam curing procedure and to inform external persons of recorded data. Accordingly, it is not necessary for purchasers to be present at a factory in order to check whether curing conditions of the products are maintained, thus saving labor cost.

Particularly, since the curing condition is desirably maintained, the recording device of the present invention improves the quality of the produced concrete products. Accordingly, the recording device of the present invention increases the life time of the precast concrete from not more than 10 years to more than 30 years, thus saving the cost for repairing the products and replacing the products with a new one.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for recording a curing temperature history on precast concrete products, comprising:
    a socket formed in the shape of a hexahedron, including a collection chamber opened at the upper portion thereof, a hole formed through a lower portion of one side wall, and a magnet installed on another side wall and serving to operate a capsule when the capsule is inserted into the collection chamber, and to protect components of the capsule when the device is buried in a designated position of the precast concrete product to be cured; and
    a capsule formed in the shape of a hexahedron, accommodated in the collection chamber of the socket, and provided with a MCU (Micro Controller Unit) installed on a printed circuit board located within the capsule and switched on/off by the magnet of the socket, so that the MCU senses a curing temperature of the precast concrete product when the device is buried in the designated position of the precast concrete product or light entering into the precast concrete product when the precast concrete product is cured, informs a user of data regarding the sensed temperature and light, and stores the data with the control of the MCU.

2. The device for recording a curing temperature history on precast concrete products as set forth in claim 1,
    wherein the device is connected to a communication terminal so that the stored data is displayed to the user.

3. The device for recording a curing temperature history on precast concrete products as set forth in claim 1,
    wherein the capsule includes:
    a state displaying unit installed on the upper surface of the capsule and switched on by the magnet of the socket when the capsule is accommodated in the collection chamber of the socket, and serving to display red light, green light, and flashing red light depending on the control of the MCU;
    a temperature-sensing unit installed at one side of the state displaying unit, and serving to sense the curing temperature of the precast concrete product per every designated time period and then to store the sensed temperature in the MCU;

a photo-sensing unit installed at a lower portion of one sidewall of the capsule, and serving to sense whether light is entering into the precast concrete product within a designated time after the beginning of the measurement of the curing temperature;

a communication port installed at the other side of the state-displaying unit and connected to a port of the communication terminal and serving to transmit the various data stored in the MCU in curing the precast concrete product to the communication terminal;

a protective rubber cap protecting the communication port from the concrete when the device is buried in the precast concrete product;

a first cover detachably inserted into a collection chamber of a first fixing unit, and serving to protect the protective rubber cap;

a second cover detachably inserted into a collection chamber of a second fixing unit and installed on the rear surfaces of the state displaying unit and the temperature sensing unit, and serving to protect the capsule; and a handgrip serving to easily handle the capsule.

4. The device for recording a curing temperature history on precast concrete products as set forth in claim 1, wherein the socket includes:

the collection chamber opened at the upper portion thereof;

the hole formed through a lower portion of one sidewall;

the magnet for operating a capsule operating switch on the printed circuit board installed in the capsule when the capsule is inserted into the collection chamber;

a first fixing unit installed on the outer surface of one side wall of the socket, and provided with a collection chamber for fixedly accommodating a first cover of the capsule; and a second fixing unit installed on the outer surface of another side wall of the socket, and provided with a collection chamber for fixedly accommodating a second cover of the capsule.

5. The device for recording a curing temperature history on precast concrete products as set forth in claim 1, wherein:

the capsule is controlled by the MCU of the printed circuit board located therein; and the printed circuit board includes:

a capsule-operating switch switched on by the magnet so that the switch initates that the battery supplies operating power to the MCU when the capsule is accommodated in the collection chamber of the socket;

the MCU serving to receive the operating power from a battery by means of the switching-on of the capsule-operating switch, to control components installed on the printed circuit board, and to store various data from the components by;

the state displaying unit serving to receive a control signal from the MCU and to display red light, green light, and flashing red light to the user;

the temperature sensing unit for sensing the curing temperature of the precast concrete product per every designated time in the concrete curing by means of the control signal of the MCU and then transmitting the sensed temperature to the MCU;

an oscillator asynchronously operated for maintaining the time by interrupting a sleep mode of the MCU per every designated time and saving the operating power;

the photo sensing unit for receiving the control signal of the MCU and then sensing whether light is detected within an initially designated time after the beginning of the measurement of the curing temperature; and a communication port connected to a port of a communication terminal and serving to transmit the various data stored in the MCU to the communication terminal for allowing the communication terminal to display the various data to the user.

6. The device for recording a curing temperature history on precast concrete products as set forth in claim 3, wherein the state-displaying unit emits a red light, when the capsule is accommodated in the collection chamber of the socket in accordance with the control of the MCU.

7. The device for recording a curing temperature history on precast concrete products as set forth in claim 3, wherein the state-displaying unit emits a green light, when the temperature-sensing unit measures the curing temperature of the precast concrete product in accordance with the control of the MCU.

8. The device for recording a curing temperature history on precast concrete products as set forth in claim 3, wherein the state displaying unit emits a flashing red light, when the battery is discharged in accordance with the control of the MCU.

9. The device for recording a curing temperature history on precast concrete products as set forth in claim 5, wherein in case that the photo sensing unit senses light within a designated time after the beginning of the measurement of the curing temperature, the MCU deletes all data stored prior to a sensed time.

10. The device for recording a curing temperature history on precast concrete products as set forth in claim 5, wherein in case that the photo sensing unit continuously senses light during a designated time, in that case the MCU recognizes that the user do not have a intention to cure the concrete, the MCU does not record curing temperature and then initializes a curing program.

* * * * *